United States Patent [19]

LoCascio

[11] Patent Number: 4,895,110
[45] Date of Patent: Jan. 23, 1990

[54] ILLUMINATED PET COLLAR

[75] Inventor: Thomas LoCascio, West Dundee, Ill.

[73] Assignee: Advance Designs and Concepts, Palatine, Ill.

[21] Appl. No.: 209,995

[22] Filed: Jun. 22, 1988

[51] Int. Cl.$^4$ ............................................. A01K 27/00
[52] U.S. Cl. ...................................... 119/106; 362/108
[58] Field of Search .......................... 119/96, 106, 109; 362/84, 103, 108

[56] References Cited

U.S. PATENT DOCUMENTS

| | | | |
|---|---|---|---|
| 2,437,628 | 3/1948 | Warren | 362/108 |
| 2,721,257 | 10/1955 | Knox | 362/108 |
| 2,798,458 | 7/1957 | Odermatt | 119/106 |
| 3,589,337 | 6/1971 | Doss | 119/106 |
| 3,641,333 | 2/1972 | Gendron | 362/108 |
| 3,720,918 | 3/1973 | Perl | 362/103 X |
| 3,753,421 | 8/1973 | Peck | 119/106 |
| 3,871,336 | 3/1975 | Bergman | 119/106 |
| 3,935,443 | 1/1976 | Simmons | 362/108 |
| 4,091,766 | 5/1978 | Colliard | 119/106 |
| 4,167,156 | 9/1979 | Kupperman et al. | 119/109 |
| 4,173,201 | 11/1979 | Chao et al. | 119/106 |
| 4,218,991 | 8/1980 | Cole | 119/106 |
| 4,224,901 | 9/1980 | Carey, Jr. | 119/106 |
| 4,377,988 | 3/1983 | Tung et al. | 119/106 |
| 4,383,548 | 5/1983 | Cohn | 119/109 |
| 4,407,233 | 10/1983 | Bozzacco | 119/106 |
| 4,652,981 | 3/1987 | Glynn | 362/108 X |
| 4,812,953 | 3/1989 | Ask et al. | 362/103 |

OTHER PUBLICATIONS

Copy of Newspaper Ad.

*Primary Examiner*—Paul J. Hirsch
*Attorney, Agent, or Firm*—Lockwood, Alex, FitzGibbon & Cummings

[57] ABSTRACT

An illuminated pet collar including a light source and a power source disposed along a strap member. A switch is included for providing an electrical connection between the ends of the strap member so that power is provided to the light source only when the ends of the strap member are connected to each other by the closure means. In one embodiment, adhesive closure members disposed at either end of the strap member. Connection of the two adhesive members to each other completes the electrical circuit within the strap member by placing a pair of ferromagnetic reeds in magnetic communication with a magnet to close the electrical circuit and provide power to the light source. In a second embodiment, a conventional buckle, with a stem member, is disposed at one end of the strap member with punch holes having metallic eyelets disposed at the other end of the strap member. The punch holes are dimensioned to receive the stem portion of the buckle member to provide a metal-to-metal contact between the stem member and the eyelets. The contact between the stem portion and the eyelets closes the electrical circuit on the collar to illuminate the light source thereon.

16 Claims, 2 Drawing Sheets

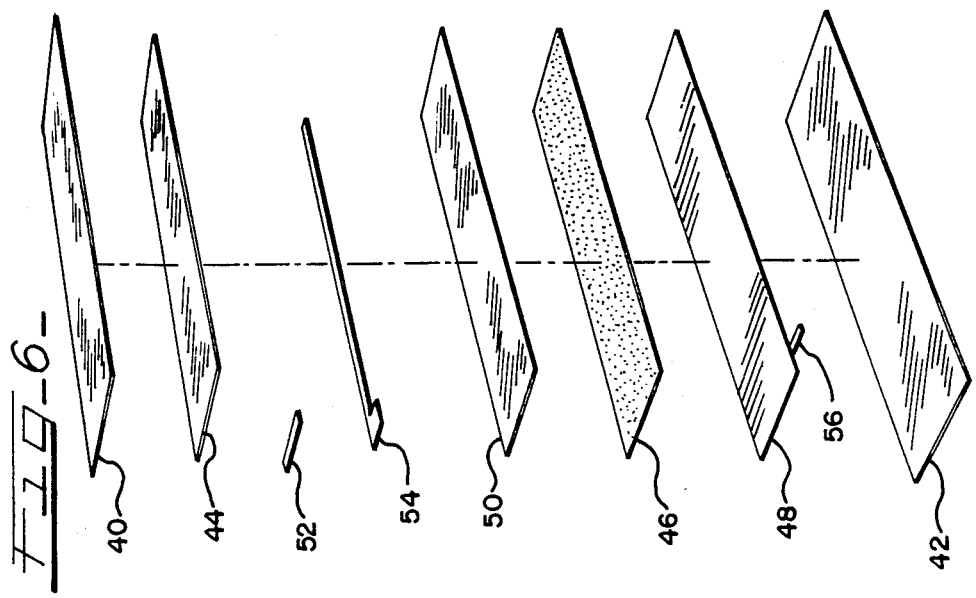
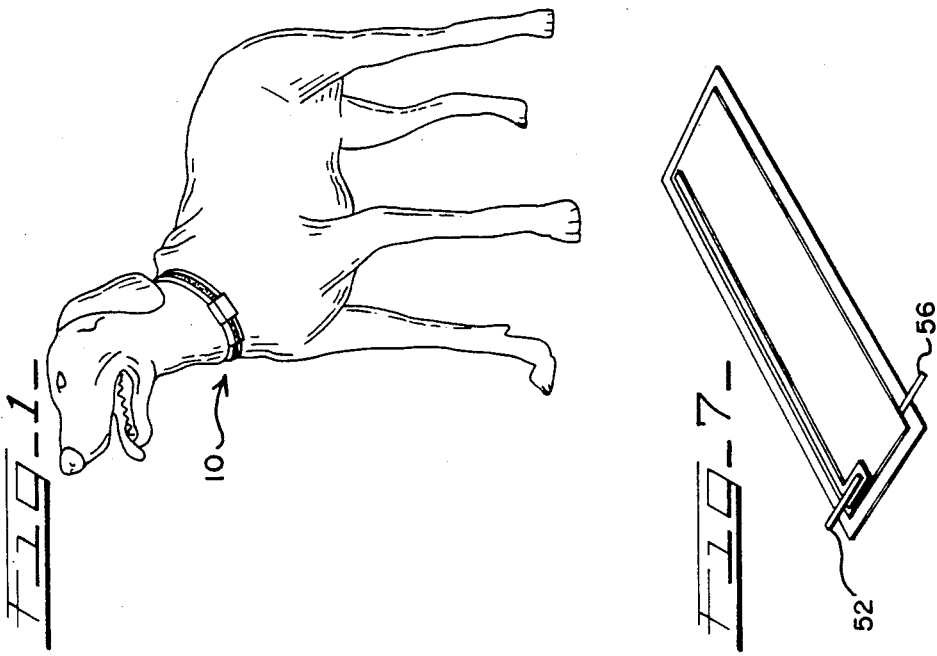

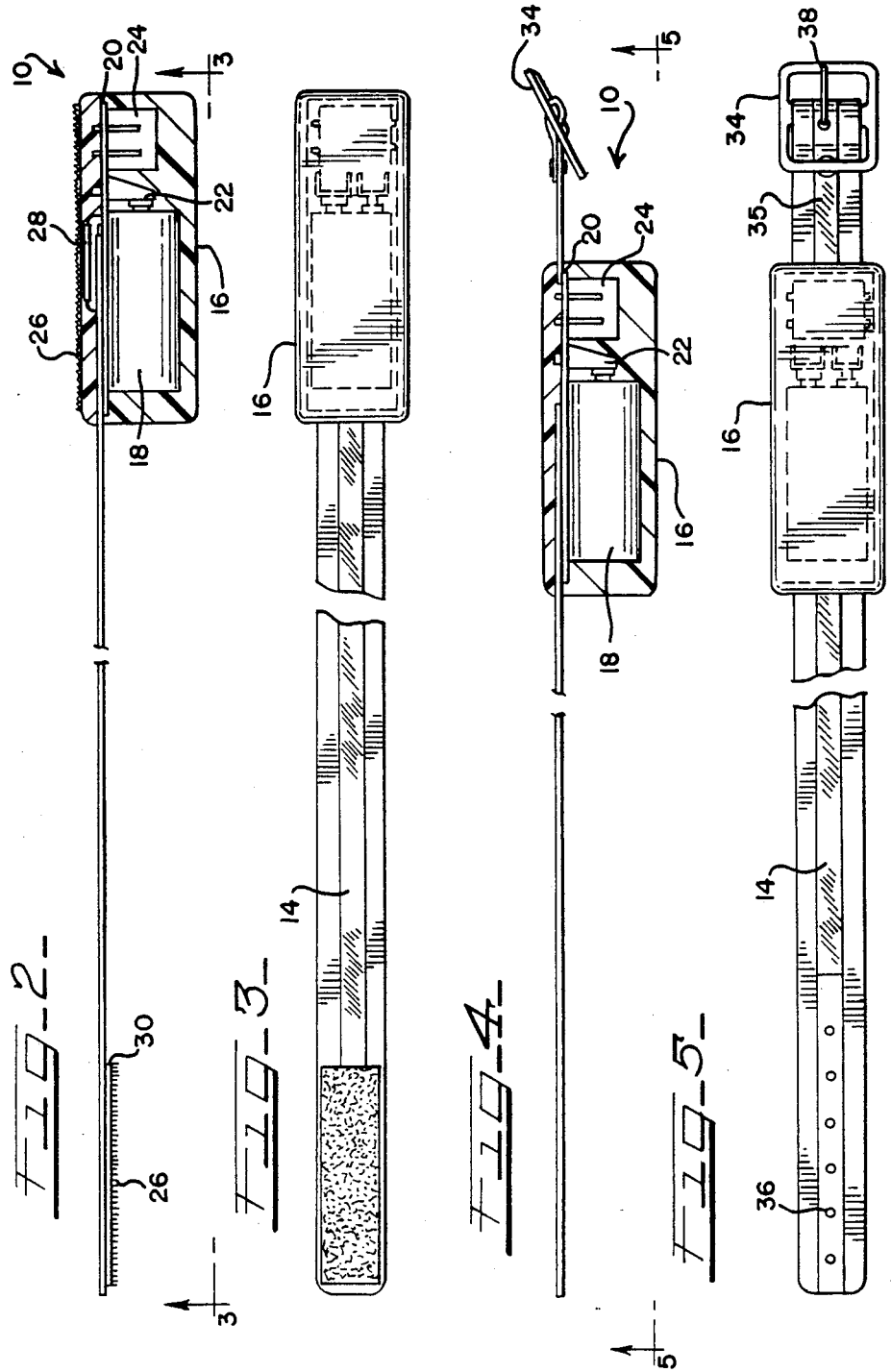

ILLUMINATED PET COLLAR

BACKGROUND OF THE INVENTION

The present invention generally relates to an illuminated pet collar. More specifically, the present invention relates to a pet collar which includes a light source and a power source disposed along an electrical circuit wherein the circuit remains open, and inoperative, when the ends of the collar are unfastened and wherein the circuit remains closed, and operative, when the ends of the collar are fastened to each other.

Various illuminated pet collars are known in the art. For example, U.S. Pat. No. 4,173,201, issued to Chao et al. on Nov. 6, 1979, discloses an illuminated collar including small electric lamps powered by a dry cell battery and disposed along an elongated leather strap. A manually operated switch protrudes outwardly from the collar for operation of the lights. U.S. Pat. 3,935,443, issued to Allen P. Simmons on Jan. 27, 1976, discloses an illuminated collar which includes a plurality of miniature filament lamps connected in parallel. A battery is disposed along the length of the collar which, when secured in its container, completes an electrical circuit to provide power to the lights. U.S. Pat. 2,721,257, issued to K. M. Knox on Oct. 18, 1955, discloses a light which is adapted to be positioned on a dog collar or other animal harness. The light is positioned within a dome and mounted on a reflector. To power the light, the dome is rotated to compress a spring and thereby force the reflector into engagement with a metallic ring to complete an operative electrical circuit between the batteries and the bulb. U.S. Pat. No. 2,437,628, issued to J.T. Warren on Mar. 9, 1948, discloses an illuminated dog harness including a metal plate disposed on the harness and carrying a socket for an electrical light bulb. A separate on/off switch is provided to manually open and close the electrical circuit to control the illumination of the light bulb.

While the above patents generally disclose an illuminated pet collar or harness, the prior art does not show an illuminated pet collar wherein the mechanism or means for affixing the collar around the animal's neck or torso is closely associated with the switch means. When so associated, the electrical circuit contained within the collar or harness is closed or completed only when the ends of the collar are secured to each other such as when the collar is worn about the neck of an animal.

It is therefore an object of the present invention to provide an illuminated pet collar.

It is another object of the present invention to provide an illuminated pet collar having a switch means to complete an electrical circuit within the collar only when the ends of the collar are secured to each other such as when the collar is secured around an animal's neck or body.

These and other objects and advantages of the present invention will be appreciated by those skilled in the art upon consideration of the remainder of the disclosure.

BRIEF DESCRIPTION OF THE INVENTION

An illuminated pet collar is provided in the form of a strap with an electrical circuit forming a part thereof. The electrical circuit includes a light source, power means for providing electrical power to the light source, and switch means for completing the electrical circuit. The pet collar includes closure means for connecting the ends of the collar to each other. In the disclosed embodiments, the switch means are operatively associated with the closure means so that the power means will provide power to the light source only when the ends of the collar are connected to each other. In one embodiment, closure means are provided in the form of a conventional buckle, with a metallic stem portion forming a part thereof, and at least one punch hole. The buckle and the punch holes are provided as operative features of the electrical circuit contained within the collar. In this manner, the buckle and punch holes also serve as switch means so that the electrical circuit is completed only when the stem portion of the buckle is inserted in one of the punch holes, as when the pet collar is secured around the neck of an animal.

In a second embodiment, the closure means include a pair of adhesive members such as, for example, a pair of strips made from a nylon fabric which is commonly known under the trade name Velcro. The adhesive members are disposed at opposite ends of the collar and are releasably attachable to each other to thereby secure the collar around an animal's neck, for example. Switch means are provided within the electrical circuit of the collar in the form of a conventional reed switch which is disposed beneath the adhesive members and is electrically connected to both the light source and the power source. As known by those skilled in the art, the reed switch includes a pair of cantilevered ferromagnetic reeds disposed beneath one of the adhesive members and a magnet disposed beneath the other adhesive member. The ferromagnetic reed magnetically communicate with the magnet when the adhesive members are connected to each other thereby closing the electrical circuit to provide power to the light source.

DETAILED DESCRIPTION OF THE DRAWINGS

FIG. 1 is a perspective view of an illuminated pet collar according to the present invention and worn by a dog;

FIG. 2 is a side elevational view of an embodiment of the present invention;

FIG. 3 is a top view of the embodiment shown in FIG. 2 and taken along the 3—3 line thereof;

FIG. 4 is a side elevational view of a second embodiment of an illuminated dog collar, according to the present invention;

FIG. 5 is a top view of the embodiment shown in FIG. 4 taken along the 4-4 line thereof;

FIG. 6 is an exploded view of the light source used in the embodiment depicted in FIGS. 1-5;

FIG. 7 is an assembled perspective view of the light source shown in FIG. 6.

DETAILED DESCRIPTION OF THE INVENTION

Referring generally to FIGS. 1-3, a first embodiment of an illuminated pet collar 10 according to the present invention is shown. The collar 10 is generally provided in the form of an elongate strap defining a longitudinal axis along which the various elements of the present invention are disposed. A light source 14 is disposed along the collar 10 and, in the preferred embodiments, is provided in the form of an electroluminescent strip which is described in more detail below. A power means 16 is affixed to the collar 10 at or near an end thereof to provide electrical power to the light source 14 when the electrical circuit of the collar 10 is completed. As shown, the power means may include a conventional 9 volt battery 18 connected to a printed circuit (PC) board 20 via PC mounted battery clips 22. The direct current from the 9 volt battery flows into an inverter 24 to provide alternating current to the light source 14. The light source 14 and the power means 16 are necessarily disposed within the circuit of the collar 10 but remain under the control of a switch means which is provided in one of at least two embodiments, as further discussed below.

In a first embodiment, shown in FIGS. 2 and 3, closure means are provided in the form of adhesive members 26. Preferably, the adhesive members 26 consist of strips of nylon fabric which are commonly known under the trade name Velcro. When the collar 12 is placed around the neck of an animal, such as a dog, for example, the adhesive members are connected to each other to form a continuous loop which is retained around the animal's neck (as in FIG. 1).

In the embodiment of FIGS. 2 and 3, switch means are provided in the form of a conventional reed switch disposed beneath the adhesive members 26. The reed switch includes a pair of cantilevered ferromagnetic reeds (not shown) located within a glass envelope 28 and positioned beneath one of the adhesive members 26. The reeds are electrically connected to the light source and the power source within the circuit of the collar 10. A magnet 30 is disposed beneath the other adhesive member 26 at the other end of the collar 10. Most commonly, the magnet 30 is manufactured to contain Aluminum, Cobalt and Nickel. In this arrangement of parts, the reed switch will complete the electrical circuit on the collar 10 only when the two adhesive members 26 are connected to each other, as when the collar is affixed to the neck of animal. For example, when the adhesive members are connected to each other, the ferromagnetic reeds are in magnetic communication with the magnet 30. The magnetic induction by the magnet 30 causes the reeds to attract each other to thereby complete the electrical circuit on the collar 10 and provide power to the light source 14. It will be appreciated by those skilled in the art that the operation of the reed switch is conventional and well known.

Referring now to FIGS. 4 and 5, a second embodiment of the present invention is depicted. Except as described below, the description of the second embodiment is identical to that discussed above, and will not be repeated. Like numerals indicate like elements. Closure means are provided in the form of a conventional buckle 34 and at least one punch hole 36. As shown, the buckle 34 includes a stem portion 38 which is electrically connected to the power means 16 by a conductor extending between the inverter 24 and the stem portion 38. The punch holes 36 are electrically connected to the light source by metallic eyelets (not shown) disposed within the punch holes and which are dimensioned to receive the stem portion 38 of the buckle 34. The eyelets are of a conventional design and are generally made from brass or some other suitable electrically conductive material. When fastened around the neck of an animal, the ends of the collar 10 are connected by inserting the end of the collar opposite the buckle 34 through the buckle and positioning the stem portion 38 within a punch hole 36. In this manner, the electrical circuit of the collar 10 is completed through the metal-to-metal contact between the stem portion 38 and the brass eyelets of the punch hole 36. With the electrical circuit complete, the light source 14 remains illuminated as long as the stem portion 38 is retained within the punch hole 36 and in contact with the eyelet.

In the embodiment depicted in FIGS. 4 and 5, the buckle member 34 is disposed at an end of the collar 10 such that the stem portion 38 is electrically connected to the power source 16. Likewise, the punch holes 36 are electrically connected to the light source 14 and are disposed at the opposite end of the collar 10 from the buckle 34. It will be understood that the buckle member 34 and the punch holes 36 may be positioned along the collar so that the buckle member 34 is electrically connected to the light source 14 and the punch holes 36 are electrically connected to the power source 16.

Referring to FIGS. 6 and 7, the light source 14 is shown in greater detail. In the described embodiments, the light source 14 is provided in the form of an electroluminescent (EL) strip such as are available through Luminescent Systems, Inc. EL strips are generally preferred over more conventional light sources because they are thin and flexible and because the solid state design of the EL strip enables them to withstand shock, vibration, and extremes in weather. Additionally, EL strips are extremely lightweight and provide a cold, uniform light source.

As shown, the EL strips include a top protective film 40 and a bottom protective film 42 which form a laminate to insulate the strip and act as a moisture barrier. The films 40 and 42 are typically made of a flexible copolymer material. A dessicant layer 44 is included for waterproofing the strip. A color-formulated phosphor 46 is sandwiched between a layer of aluminum foil 48 and a transparent electrode 50. The front lead 52 is electrically connected to bus bar 54 in between the dessicant 44 and the transparent electrode 50. A back lead 56 is affixed to the foil 48. Accordingly, front and back leads 2 and 56, respectively, are connected to the PC board 20 to provide the necessary electrical connection to energize the light source 14 when the circuit is closed.

In general, the collar 10 may be manufactured with the light source affixed to a conventional strap or harness. Such additional support may be required when manufacturing the embodiment of FIGS. 4 and 5, or its equivalents. However, when the switch means include a reed switch, the additional strap member should not be required since the discussed EL strips can be obtained in sufficient size to be essentially self-supporting when used as a pet collar. In the embodiments of FIGS. 1 and 2, the EL strip is provided in the form of an elongate strap.

It is contemplated that other closure means and other switch means may be possible, as known by those skilled in the art. For example, a conventional snap, or its equivalent, may be employed in place of the buckle member 34 and the punch holes 36. In such an arrangement of parts, the snap could serve as both the closure means and the switch means so that the electrical circuit of the collar 12 would be completed only when the two portions of the snap were connected to each other.

While the various embodiments of the invention have been disclosed and described, it will be understood that various modifications may be possible, as known by those skilled in the art, without departing from the true spirit and scope of the present invention as defined in the following claims.

What is claimed is:

1. An improved illuminated pet collar having a light source disposed along an elongate strap, and a power source electrically connected to the light source to provide power thereto, the improvement comprising:
   a buckle member affixed to one end of the collar and including a metallic stem portion, said stem portion being electrically connected to the power source; and
   at least one punch hole located along the longitudinal axis of said collar, said punch hole being electrically connected to said light source and dimensioned to receive said stem portion therein such that retaining said stem portion within said punch hole completes an electrical circuit to thereby provide power to said light source.

2. The illuminated pet collar of claim 1, wherein said light source consists of an electroluminescent strip.

3. The illuminated pet collar of claim 1, wherein said power source includes a 9 volt battery electrically connected to a printed circuit board, and an inverter for converting the direct current from said battery to alternating current.

4. An improved illuminated pet collar having a light source disposed along an elongate strap member, a power source electrically connected to the light source to provide power thereto, and a pair of adhesive members disposed at opposite ends of the collar each adhesive member being releasably attachable to the other adhesive member to thereby connected the ends of the collar to each, the improvement comprising:
   a reed switch, including a pair of cantilevered ferromagnetic reeds electrically connected to the power source and the light source, respectively, said reeds being disposed beneath one of the adhesive members, and a magnet disposed beneath the other adhesive member; and
   said ferromagnetic reeds magnetically communicate with said magnet when said adhesive members are connected to each other to close an electrical circuit and thereby provide power to said light source.

5. The illuminated pet collar of claim 4, wherein said light source consists of an electroluminescent strip.

6. The illuminated pet collar of claim 4, wherein said power source includes a 9 volt battery electrically connected to a printed circuit board, and an inverter for converting the direct current from said battery to alternating current.

7. The illuminated pet collar of claim 4, wherein said adhesive members comprise hook and latch members.

8. The illuminated pet collar of claim 4, wherein said magnet contains Aluminum, Cobalt, and Nickel.

9. An illuminated pet collar, comprising:
   an elongate strap including a light source disposed therealong, said elongate strap having two end positions;
   power means, said power means positioned along said strap and electrically connected to said light source for providing electrical power thereto;
   closure means for connecting said two end portions of said strap to each other, said closure means including a buckle with a stem portion forming a part thereof, said buckle being disposed at one of said end portions of said strap member and at least one punch hole dimensioned to receive said stem portion disposed along the longitudinal axis of said strap in proximate spacial relationship to the other said end portion of said strap member, said punch hole receiving said stem portion therein to thereby releasably connect said end portions of said strap; and
   switch means for completing an electrical circuit within said strap such that said power means provides power to said light source only when said end portions of said strap are connected to each other by said closure means.

10. The illuminated pet collar of claim 9, wherein said switch means includes said buckle and said at least one punch hole, said stem portion of said buckle being electrically connected to said power source and said punch hole being connected to said light source such that connecting said stem portion to said punch hole closes an electrical circuit to thereby provide power to said light source.

11. The illuminated pet collar of claim 9, wherein said closure means include a pair of adhesive members disposed along said end portions of said elongated strap member, each said adhesive member being releasably attached to the other said adhesive member to thereby connect said end portions of said strap.

12. The illuminated pet collar of claim 11, wherein said switch means comprises a reed switch, said reed switch including a pair of cantilevered ferromagnetic reeds which are electrically connected to said power source and said light source, respectively, said reeds being disposed at one of said end portions and a magnet being disposed at the other said end portions such that said ferromagnetic reeds magnetically communicate with said magnet when said end members are connected to each other to thereby complete an electrical circuit and provide power to said light source.

13. The illuminated pet collar of claim 11, wherein said adhesive members comprise hook and latch members.

14. An illuminated pet collar, comprising:
   an elongate strap including a light source disposed therealong, said elongate strap having two end portions;
   power means, said power means positioned along said strap and electrically connected to said light source for providing electrical power thereto;
   closure means for connecting said end portions of said strap to each other, said closure means including a pair of adhesive members dispersed along said end portions, each said adhesive member being releasably attachable to the other said adhesive member; and
   switch means for completing an electrical circuit within said strap, said switch means consisting of a reed switch including a pair of cantilevered ferromagnetic reeds which are electrically connected to said power source and said light source, respectively, said reeds being disposed at one of said end portions, and a magnet being disposed at the other said end portion such that said ferromagnetic reeds magnetically communicate with said magnet when said end members are connected to each other to thereby complete an electrical circuit and to provide power to said light source.

15. The illuminated pet collar of claim 14 wherein said adhesive members comprise hook and latch members.

16. The illuminated pet collar of claim 14 wherein, said magnet contains aluminum, cobalt and nickel.

* * * * *